United States Patent [19]
Kutka

[11] Patent Number: 5,168,357
[45] Date of Patent: Dec. 1, 1992

[54] METHOD FOR A CALCULATION OF A DECISION RESULT FOR A FIELD/FRAME DATA COMPRESSION METHOD

[75] Inventor: Robert Kutka, Geltendorf, Fed. Rep. of Germany

[73] Assignee: Siemens Aktiengesellschaft, Munich, Fed. Rep. of Germany

[21] Appl. No.: 730,858

[22] PCT Filed: Mar. 21, 1990

[86] PCT No.: PCT/DE90/00225
§ 371 Date: Jul. 22, 1991
§ 102(e) Date: Jul. 22, 1991

[87] PCT Pub. No.: WO90/15506
PCT Pub. Date: Dec. 13, 1990

[30] Foreign Application Priority Data
May 30, 1989 [DE] Fed. Rep. of Germany ....... 3917567

[51] Int. Cl.⁵ .............................................. H04N 7/13
[52] U.S. Cl. .................................... 358/135; 358/136
[58] Field of Search ............... 358/135, 136, 105, 133, 358/140

[56] References Cited

U.S. PATENT DOCUMENTS 4,837,618  6/1989  Hatori et al. .................. 358/135
5,091,782  2/1992  Krause et al. .................. 358/135

FOREIGN PATENT DOCUMENTS

0282135A1  9/1988  European Pat. Off.

Primary Examiner—Victor R. Kostak
Attorney, Agent, or Firm—Hill, Van Santen, Steadman & Simpson

[57] ABSTRACT

A 16×16 picture block of an HDTV television picture is transformed with a discrete cosine transformation as a 16×16 frame block or is separately transformed in respectively two 16×8 field blocks according to a decision method. Picture value differences between pairs of field picture elements of two picture lines of the same field are absolutely summed up to form a field sum. Likewise, picture value differences between pairs of frame picture elements of two picture lines of the frame are absolutely summed up to form a frame sum. The frame sum multiplied by a frame weighting factor is subtracted from the field sum to form what may be a positive decision result. Given a positive decision result, the frame is transformed; otherwise, the two fields are separately transformed.

10 Claims, 6 Drawing Sheets

| | | | |
|---|---|---|---|
| $B_{1,2}$ | $B_{2,2}$ | . . . . | $B_{16,2}$ |
| ↕ $P_H$ | ↕ $P_H$ | | ↕ $P_H$ |
| $B_{1,4}$ | $B_{2,4}$ | . . . . | $B_{16,4}$ |
| ↕ $P_H$ | ↕ | | ↕ |
| $B_{1,6}$ | $B_{2,6}$ | . . . . | $B_{16,6}$ |
| ⋮ | ⋮ | | ⋮ |
| $B_{1,14}$ | $B_{2,14}$ | . . . . | $B_{16,14}$ |
| ↕ $P_H$ | ↕ | | ↕ $P_H$ |
| $B_{1,16}$ | $B_{2,16}$ | . . . . | $B_{16,16}$ |

| B 1,1 | B 2,1 | . . . | B 16,1 |
|---|---|---|---|
| ↕ P$_H$ | ↕ P$_H$ | | ↕ P$_H$ |
| B 1,3 | B 2,3 | . . . | B 16,3 |
| ↕ P$_H$ | | | |
| B 1,5 | B 2,5 | . . . | B 16,5 |
| | | | |
| ⋮ | ⋮ | | ⋮ |
| B 1,13 | B 2,13 | | B 16,13 |
| ↕ P$_H$ | | | ↕ P$_H$ |
| B 1,15 | B 2,15 | | B 16,15 |
| | | | |

| | | | |
|---|---|---|---|
| $B_{1,1}$ | $B_{2,1}$ | . . . | $B_{16,1}$ |
| $P_V\updownarrow B_{1,2}$ | $P_V\updownarrow B_{2,2}$ | . . . | $P_V\updownarrow B_{16,2}$ |
| $P_V\updownarrow B_{1,3}$ | $B_{2,3}$ | . . . | $B_{16,3}$ |
| $B_{1,4}$ | $B_{2,4}$ | . . . | $B_{16,4}$ |
| $B_{1,5}$ | $B_{2,5}$ | . . . | $B_{16,5}$ |
| $B_{1,6}$ | $B_{2,6}$ | . . . | $B_{16,6}$ |
| ⋮ | ⋮ | | ⋮ |
| $B_{1,13}$ | $B_{2,13}$ | . . . | $B_{16,13}$ |
| $P_V\updownarrow B_{1,14}$ | $B_{2,14}$ | . . . | $B_{16,14}$ |
| $B_{1,15}$ | $B_{2,15}$ | . . . | $B_{16,15}$ |
| $P_V\updownarrow B_{1,16}$ | $B_{2,16}$ | . . . | $P_V\updownarrow B_{16,16}$ |

| 1 | 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|---|
| 0 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 0 | 0 | 0 | 1 | 1 | 1 | 1 | 1 | 1 | 1 | 1 | 1 | 1 | 1 | 1 | 1 |
| 0 | 0 | 1 | 1 | 1 | 1 | 1 | 1 | 1 | 1 | 1 | 1 | 1 | 1 | 1 | 1 |
| 0 | 0 | 0 | 0 | 0 | 1 | 1 | 1 | 1 | 1 | 1 | 1 | 1 | 1 | 1 | 1 |
| 0 | 0 | 0 | 0 | 1 | 1 | 1 | 1 | 1 | 1 | 1 | 1 | 1 | 1 | 1 | 1 |
| 0 | 0 | 0 | 0 | 0 | 0 | 0 | 1 | 1 | 1 | 1 | 1 | 1 | 1 | 1 | 1 |
| 0 | 0 | 0 | 0 | 0 | 0 | 1 | 1 | 1 | 1 | 1 | 1 | 1 | 1 | 1 | 1 |
| 0 | 0 | 0 | 0 | 0 | 0 | 0 | 0 | 0 | 1 | 1 | 1 | 1 | 1 | 1 | 1 |
| 0 | 0 | 0 | 0 | 0 | 0 | 0 | 0 | 1 | 1 | 1 | 1 | 1 | 1 | 1 | 1 |
| 0 | 0 | 0 | 0 | 0 | 0 | 0 | 0 | 0 | 0 | 0 | 1 | 1 | 1 | 1 | 1 |
| 0 | 0 | 0 | 0 | 0 | 0 | 0 | 0 | 0 | 0 | 1 | 1 | 1 | 1 | 1 | 1 |
| 0 | 0 | 0 | 0 | 0 | 0 | 0 | 0 | 0 | 0 | 0 | 0 | 1 | 1 | 1 | 1 |
| 0 | 0 | 0 | 0 | 0 | 0 | 0 | 0 | 0 | 0 | 0 | 0 | 1 | 1 | 1 | 1 |
| 0 | 0 | 0 | 0 | 0 | 0 | 0 | 0 | 0 | 0 | 0 | 0 | 0 | 0 | 0 | 1 |

2903

METHOD FOR A CALCULATION OF A DECISION RESULT FOR A FIELD/FRAME DATA COMPRESSION METHOD

BACKGROUND OF THE INVENTION

The invention is directed to a method for a calculation of a decision result for a field/frame data compression method, wherein chronologically successive picture values of picture elements from a picture detail of a picture that may be moving on a case-by-case basis in a line jump scanning are recorded in picture lines of two fields that can be combined to form a frame, and whereby the field/frame data compression method is applied to the frame given a positive result of the decision but is otherwise separately applied to the two fields.

A method of the said species can be particularly employed for the transmission of high-resolution digital video signals whose transmission ensues, for example, with a bandwidth of 120 megabits per second given employment of a data compression by the factor 8 in order to reduce the data rate required. Data composed of luminance values and chrominance values of picture elements are thereby transmitted compressed by utilization of the correlation between neighboring elements. For example, a discrete cosine transformation can be employed for the implementation of the data compression method.

In the periodical SPIE, Vol. 594, Image Coding, 1985, the authors H. Hoelzlwimmer, W. Tengler, A. V. Brandt have disclosed a data compression method under the title "A New Hybrid Coding Technique for Video Conference Applications at 2 Mbit/s", wherein video images recorded in the line-scanning method are coded with a discrete cosine transformation. Image blocks of 16×16 picture elements are thereby transformed.

In the line-scanning method, two fields are recorded that are combined to form a frame. Given a picture detail that is not moving or is only slightly moving, the frame is transformed for the implementation of the data compression. The two fields are separately transformed particularly given a dominating horizontal motion in the image detail in the direction of the picture lines. A method is thereby required to arrive at a calculation of a decision result for the field/frame data compression method.

Under the title "Coding strategies based on DCT for the transmission of HDTV" in the Proceedings of the 2nd International Workshop on HDTV, L'Aquila, 1988, the authors M. Barbero, M. Stroppiana, S. Cucci have disclosed a method for a calculation of a decision result for the field/frame data compression method wherein the data rate is optimized according to the mean quadratic error of the signal-to-noise ratio.

Under the title "Comparison between progressive and interlaced scanning for a future HDTV System with digital data rate reduction" in the Proceedings of the 2nd International Workshop on signal processing of HDTV, Vol. 1, Scuola Superiore G. Reis Romoli, Feb. 20 through Mar. 2, 1988, the authors D. Westerkamp and H. Peters have disclosed a method for a calculation of a decision result for a field/frame data compression method which employs the plurality of coefficients unequal to zero in the transformed block for evaluation.

Under the title "A 15 Mbit/s codec for component video signals" at the Picture Coding Symposium PCS'88, Turin, Italy, Sep. 12 through Sep. 14, 1988, the author E. Peters has disclosed a method for a calculation of a decision result for a field/frame data compression method that employs special coefficients of the motion for estimated motion vectors.

SUMMARY OF THE INVENTION

The object of the invention is comprised in specifying a further method for a calculation of a decision result for a field/frame data compression method.

This object is achieved by a method that is characterized in that the calculation of the decision result is implemented in the following way:
a) from a respective pair of field picture elements formed of two of the picture elements at an identical picture element position in respectively two of the immediately successive picture lines of the same field, a respective field difference is calculated from a difference of the picture values of the picture elements of the pair of field picture elements and the field differences of all of the pairs of field picture elements of both fields are absolutely summed up to form a field sum;
b) of a respective pair of frame picture elements formed by two of the picture elements at the same picture element position in respectively two of the picture lines lying immediately next to one another in the frame composed of the fields in respectively one of the fields, a respective frame difference of the difference of the picture values of the picture elements of the pair of frame picture elements is calculated and the frame differences of all pairs of frame picture elements are absolutely summed up to form a frame sum;
c) the frame sum is multiplied by a frame weighting factor to form a frame product and the frame product is subtracted from the field sum to form the positive decision result.

In an especially simple way, this advantageously simple decision method recognizes a motion in the direction of the picture lines on the basis of the field sum and frame sum. On the basis of the difference of field sum and frame sum, a motion is weighted in an advantageously simple way on the basis of the frame weighting factor and is taken into consideration in the calculation of the decision result. According to, for example, a mathematical transformation of the described relationship, the decision can be calculated just as well, for example, by a defined decision limit value for a quotient of field sum divided by frame sum or, for example, on the basis of a defined decision limit value for a quotient of the difference of field sum minus frame sum divided by the sum of field sum plus frame sum.

The decision method can be particularly employed for picture details that are recorded in the line-scanning method. The decision method is thereby independent of the respective data compression method. The frame weighting factor can thereby be adapted to the data compression method and is approximately 0.9 in most applications. With, for example, a subjective evaluation of test scenes, an optimum value for the frame weighting factor can be found.

Advantageously, the decision method is not bound to a defined data compression method. The data compression method, for example, is a discrete cosine transformation or a vector quantizing or a method wherein what are referred to as model pictures are employed from which the picture detail is approximately portrayed in a weighted superimposition or is a hierarchic method, for example a quad tree wherein, with different block sizes, blocks are hierarchically subdivided into inner blocks.

A preferred embodiment of the invention is characterized in that the data compression method is a discrete cosine transformation that can be advantageously employed for many picture contents that often occur.

A further, preferred embodiment of the invention is characterized in that the frame weighting factor has a numerical value between 0.8 and 1.0. For a great number of test scenes given a pixel-by-pixel comparison of the picture values of an image recorded compressed to the image recorded non-compressed, the mean quadratic error is adequately beneficial, this being critical in defining what is referred to as the signal-to-noise ratio.

A further preferred embodiment of the invention is characterized in that the frame weighting factor has the numerical value of 0.9. Given a subjective evaluation of test scenes, for example "Kiel Harbor" or "Doll", this frame weighting factor is found to be optimum. The said test scenes were recorded by the Institut fuer Rundfunktechnik and they are often deemed beneficial for a subjective evaluation.

A further preferred embodiment of the invention is characterized in that the picture detail is a 16×16 picture element block of a video picture that is either transformed as a 16×16 frame block or is separately transformed in respectively two 16×8 field blocks. This block division is advantageous particularly for a discrete cosine transformation.

A further preferred embodiment of the invention is characterized in that the picture detail is recorded with a high-resolution television method, what is referred to as "high definition television". The known advantages of this television method can thereby be used, particularly relating to a high image quality.

A further preferred embodiment of the invention is characterized in that the picture detail is an 8×8 picture element block of a video picture that is transformed either as an 8×8 frame block or is separately transformed in respectively two 8×4 field blocks. This block division for specially detailed picture scenes is particularly advantageous for a discrete cosine transformation.

The particular advantages of the decision method of the invention lie particularly therein that this is contrast-independent. Given, for example, an increase in the contrast, the frame sum and the field sum as well increase, so that the decision result remains the same.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

Figure 1:
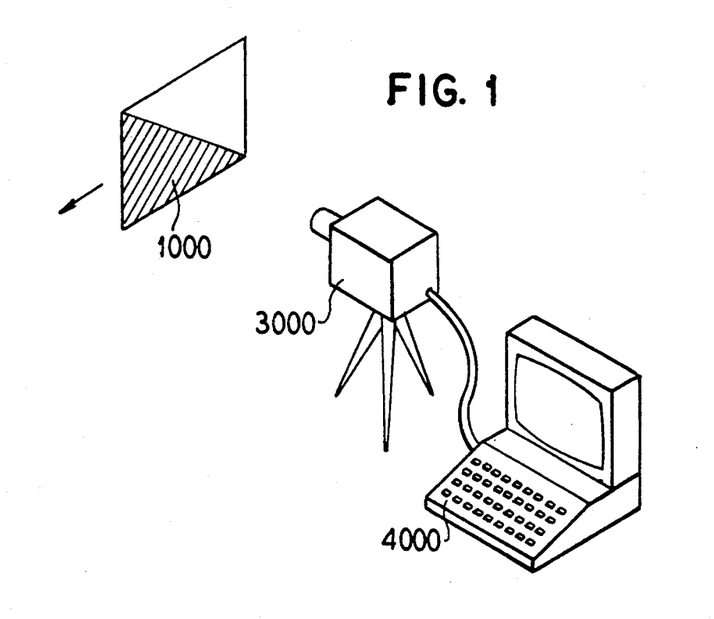
FIG. 1 shows the arrangement for the exemplary embodiment.

As FIG. 1 shows, a picture detail 1000 that moves horizontally toward the left is recorded with a camera 3000 in this exemplary embodiment. The picture values thereby recorded in a line-scanning method are stored compressed in a computer system 4000 after the implementation of a discrete cosine transformation.

Figure 2:
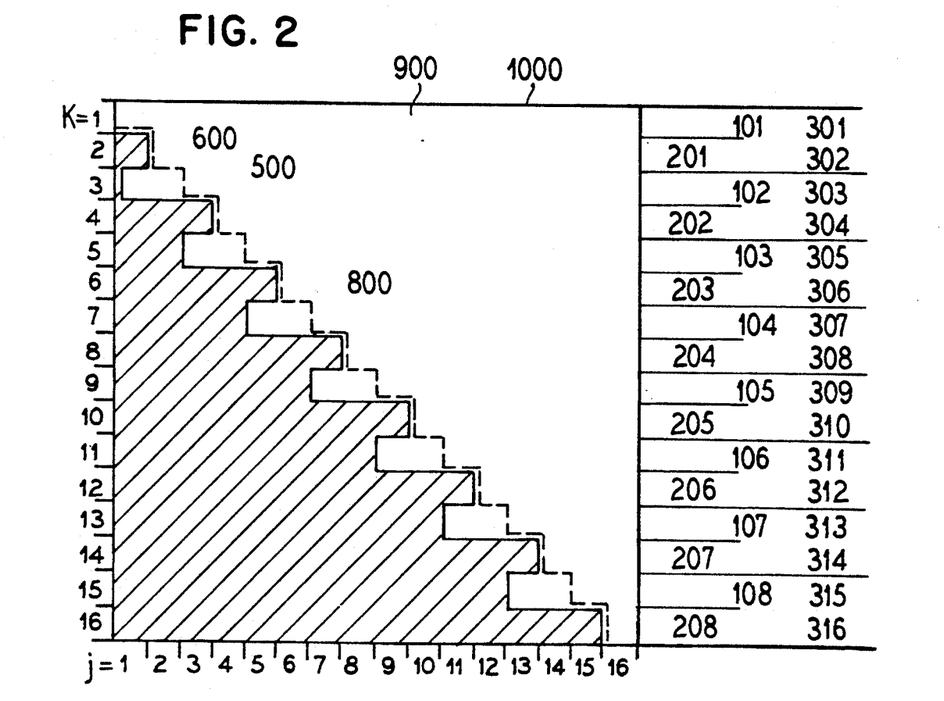
FIG. 2 shows the picture detail of the exemplary embodiment.

As FIG. 2 shows, the picture detail 1000 is composed of 16×16 picture elements. The picture detail 1000 is recorded in two fields in a line-scanning method. The first recorded field is composed of the picture lines 101, 102 through 108. The subsequently recorded, second field is composed of the picture lines 201, 202 through 208. The frame composed of the picture lines 301, 302 through 316 is composed of the two fields. The imaged subject matter is thereby a diagonal boundary line between a bright region 900 and a dark region 800 of the picture detail 1000. This boundary line moves horizontally toward the left. Caused by the motion, the boundary line 600 is obtained in the recorded picture detail 1000.

Without this motion, the boundary line 500 would be obtained in the recorded picture detail 1000, this being entered with broken lines to facilitate understanding.

In this exemplary embodiment, a picture value of a picture element in the bright region 900 is recorded with a value equal to 1. A picture value of a picture element in the dark region 80 in this exemplary embodiment is recorded with a value equal to zero. On the basis of indexing, the picture values $B_{j,k}$ recorded at the picture elements are discriminated. The first index j respectively references the picture element position in the picture lines 301–316. The second index k references the position of the picture line in the frame that can be composed of the fields. In this exemplary embodiment, thus, the recorded picture value at the 15th picture element position in the 16th picture line is $B_{15.16}=0$ and the recorded picture value at the 16th picture element position in the 16th picture line is $B_{16.16}=1$.

Figure 3:
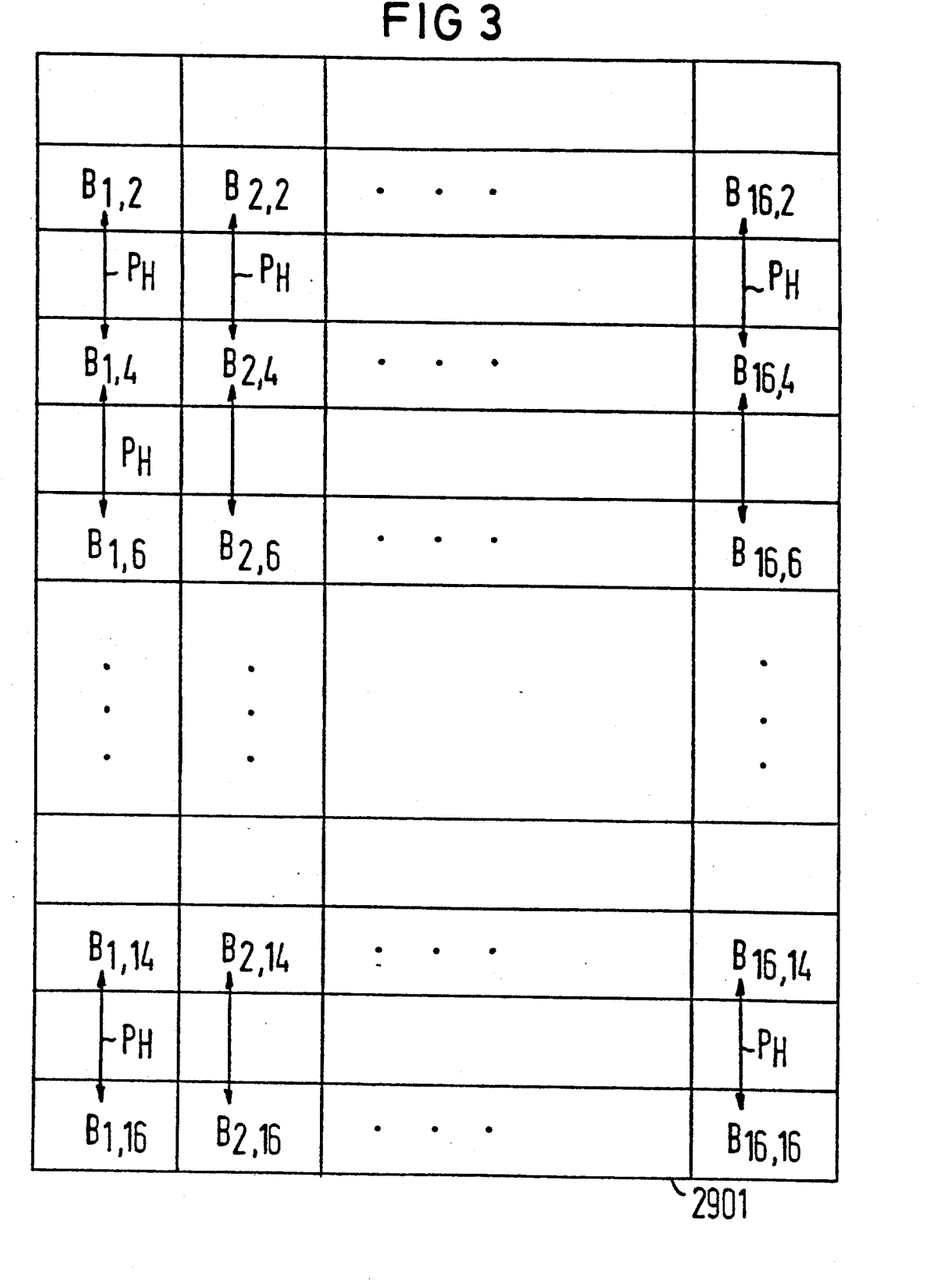
FIG. 3 shows the entered picture values of the first field.

As FIG. 3 shows, the picture values of the first field in this exemplary embodiment are entered into the data structure 2901 which, just like the picture detail 1000, is divided into 16 rows and 16 columns. Pairs $P_H$ of field picture elements are formed from respectively two picture elements at an identical picture element position in respectively two of the immediately successive picture lines.

Figure 4:
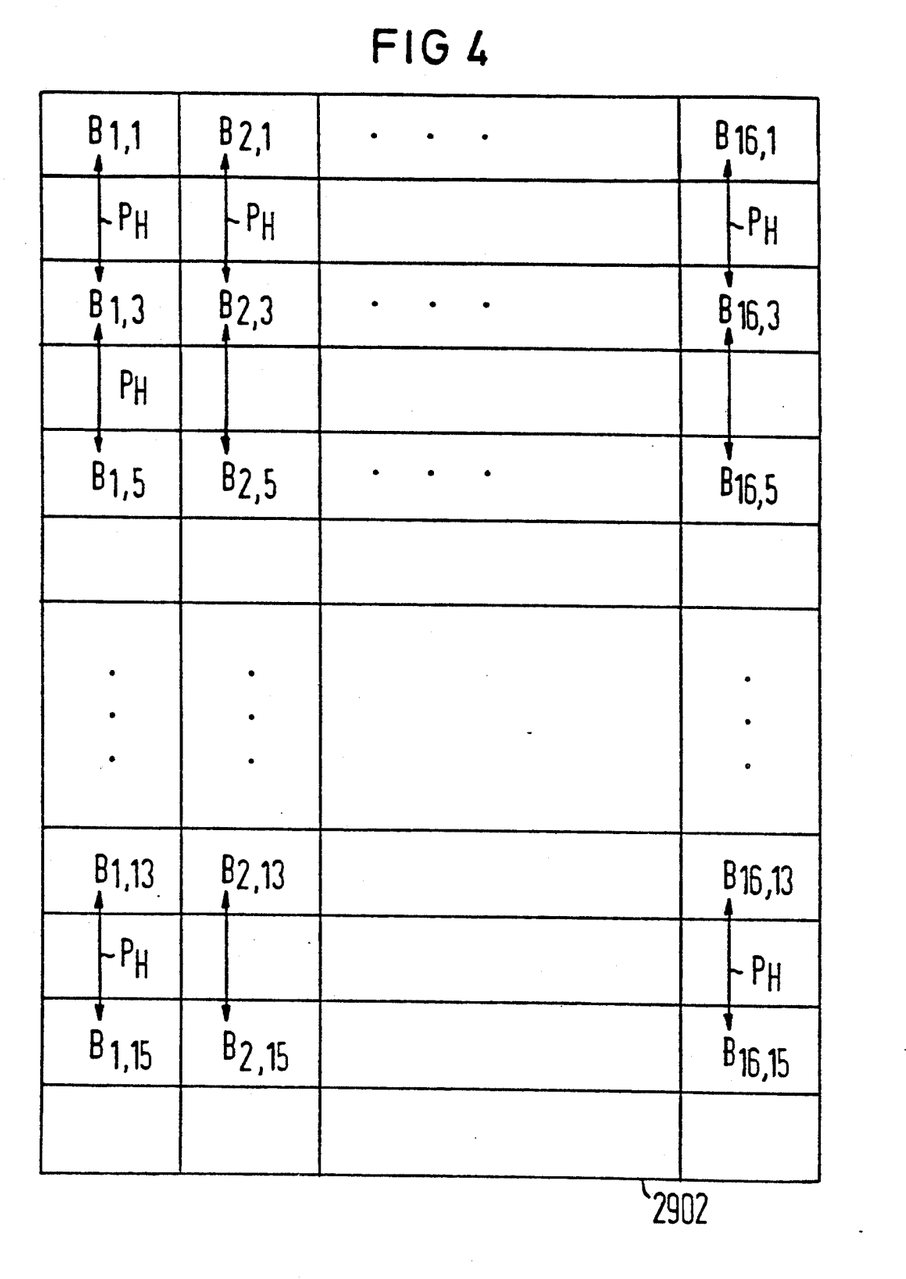
FIG. 4 shows the entered picture values of the second field.

As FIG. 4 shows, the picture values of the second field in this exemplary embodiment are entered into the data structure 2902 which, just like the picture detail 1000 is divided into 16 rows and 16 columns. Pairs $P_H$ of field picture elements are formed of respectively two picture elements at an identical picture element position in respectively two of the immediately succeeding picture lines.

Figure 5:
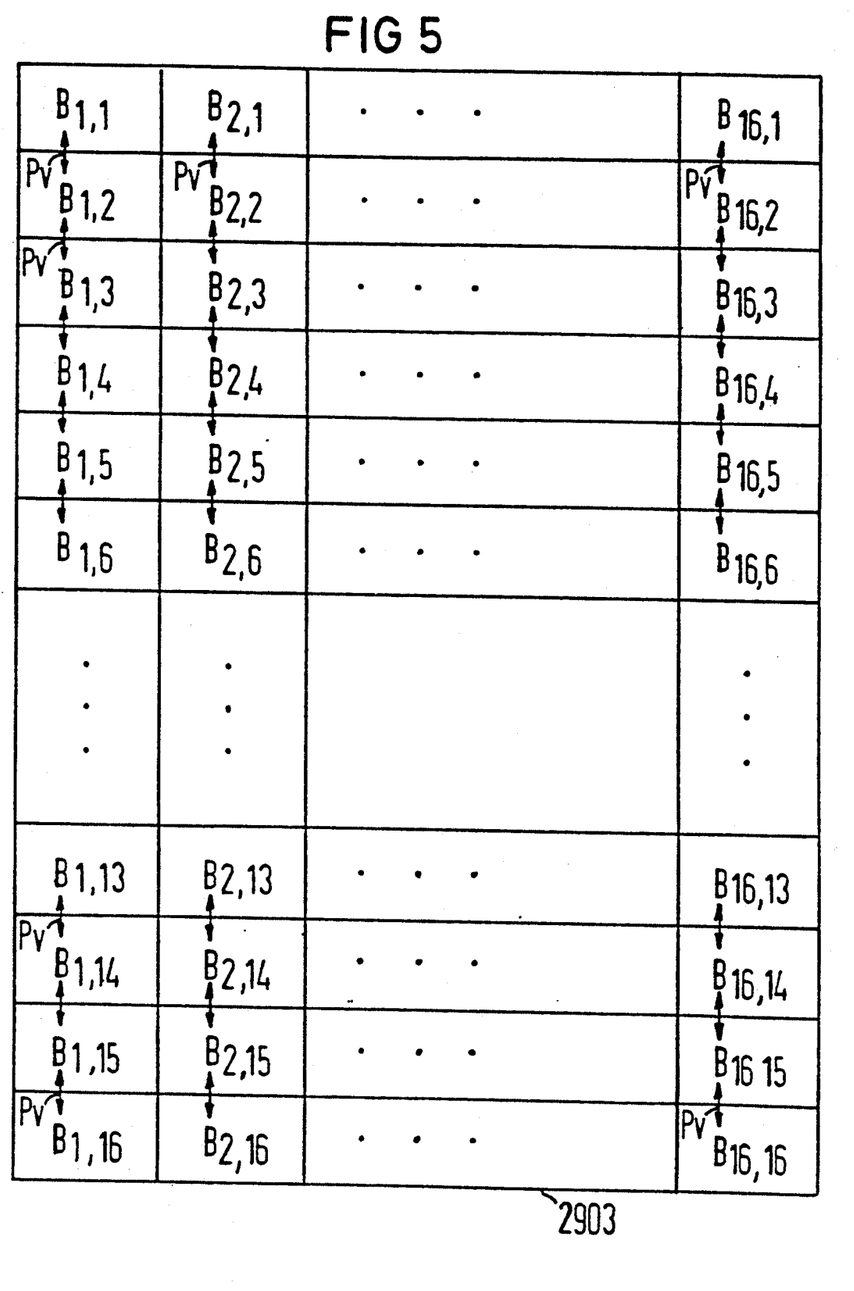
FIG. 5 shows the entered picture values of the frame.

As FIG. 5 shows, the picture values of the frame in this exemplary embodiment are entered into the data structure 2903 which, just like the picture detail 1000, is divided into 16 rows and 16 columns. Pairs $P_V$ of frame picture elements are formed of respectively two picture elements at an identical picture element position in respectively two of the immediately successive picture lines.

Figure 6:
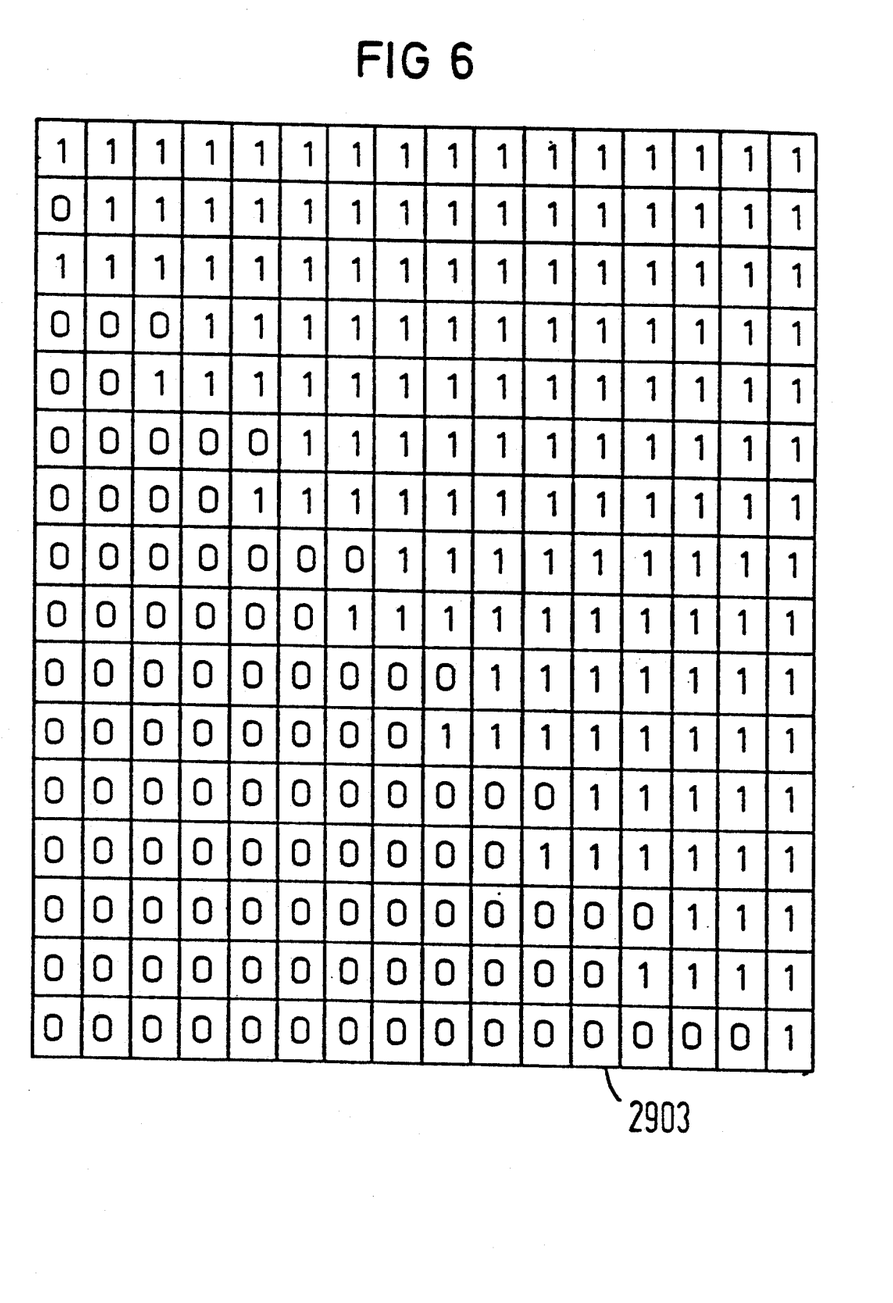
FIG. 6 shows the entered numerical values of the picture values of the frame.

As FIG. 6 shows, the numerical values 0 and 1 are entered as the picture values into the data structure 2903 given this exemplary embodiment.

The field sum HS in this exemplary embodiment is calculated in the following way:

$$HS = |B_{j,k} - B_{j,k+2}| = 26$$

$$j = 1, \ldots 16$$
$$k = 1, \ldots 14$$

The frame sum VS in this exemplary embodiment is calculated in the following way:

$$VS = |B_{j,k} - B_{j,k+1}| = 29$$

$$j = 1, \ldots 16$$
$$k = 1, \ldots 14$$

Given an employment of a frame weighting factor of 0.9, the decision result E is calculated therefrom in the following way:

$$E = HS - 0.9 \cdot VS = -0.1$$

According to the negative decision result E, the data compression method in this exemplary embodiment is separately applied to both fields.

What is thereby achieved in this exemplary embodiment is that the horizontal motion in the direction of the picture lines is recognized on the basis of the difference between field sum and frame sum and that an evaluation and consideration of the perceived motion ensues on the basis of the frame weighting factor, so that the correlation of neighboring points in the fields is given priority in this exemplary embodiment over the correlation of neighboring points in the frame in the data compression.

Figure 7:
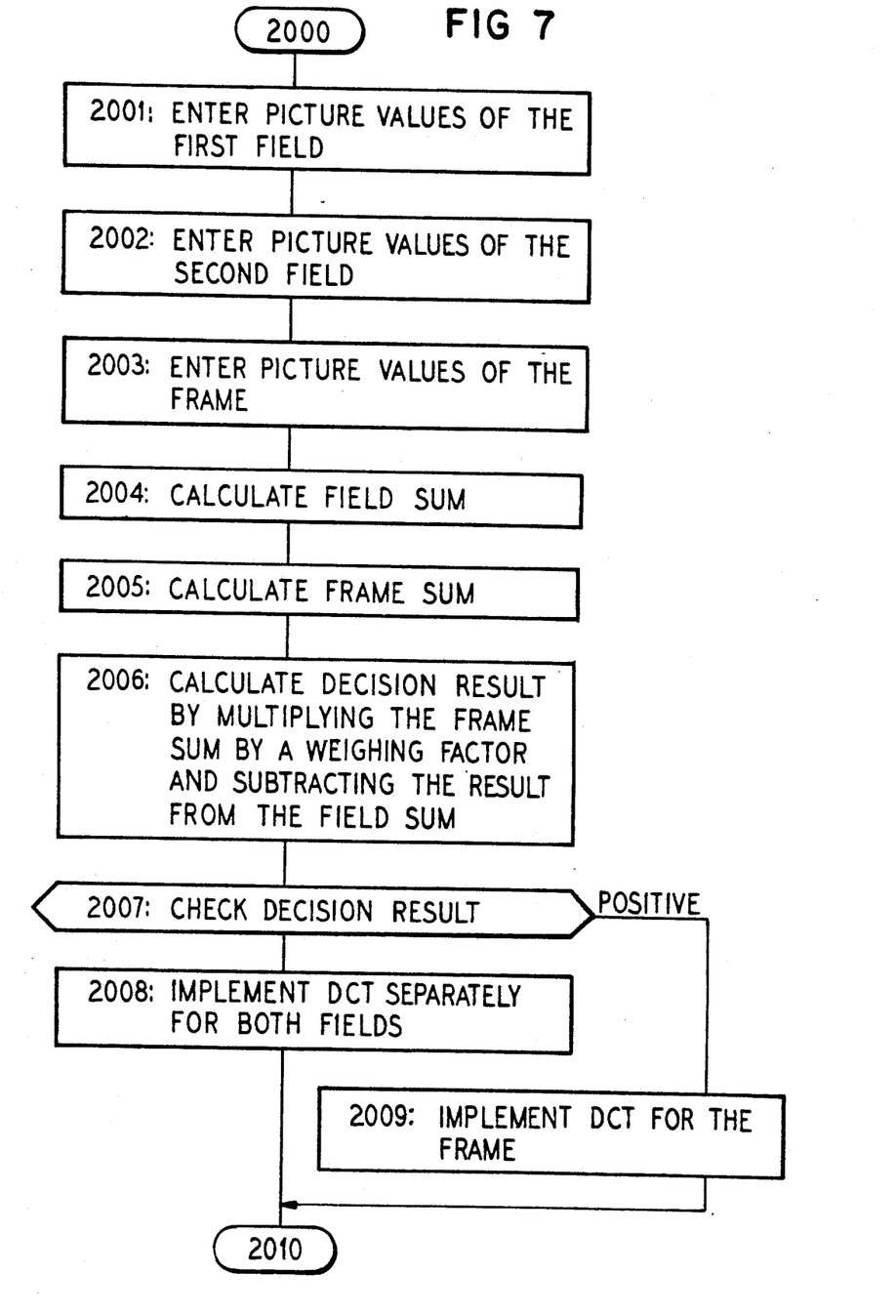
FIG. 7 shows a flow chart for compressing the picture detail.

As FIG. 7 shows, a computer program whereof the inventive execution is reproduced in the illustrated flow chart is employed in this exemplary embodiment in the computer system 4000.

Beginning with the program point 2000, the picture values of the first field are first entered into the data structure 2901 with the instruction 2001.

Subsequently, the picture values of the second field are entered into the data structure 2902 with the instruction 2002.

Subsequently, the picture values of the frame are entered into the data structure 2903 with the instruction 2003.

Subsequently, the field sum is calculated with the instruction 2004. For both fields, the field differences are thereby absolutely summed up, these being formed from the differences between the picture values of the pairs of field picture elements. In this exemplary embodiment, the numerical value 26 is calculated for the field sum for the picture detail 1000.

Subsequently, the frame sum is calculated with the instruction 2005. For the frame, the frame differences are thereby absolutely summed up, these being formed from the differences between the picture values of the pairs of frame picture elements. In this exemplary embodiment, the numerical value 29 is thereby calculated for the frame sum for the picture detail 1000.

Subsequently, the decision result is calculated with the instruction 2006. The frame sum is thereby multiplied by the frame weighting factor which is equal to the numerical value 0.9 in this exemplary embodiment. The frame product that is thereby formed is subtracted from the field sum, so that the decision result having a numerical value equal to $-0.1$ is calculated for the picture detail 1000 in this exemplary embodiment.

Subsequently, the decision result is checked with the instruction 2007 and, given a positive result of the decision, a branch is made to the instruction 2009 with which the discrete cosine transformation for the frame is implemented.

Given the negative decision result as in this exemplary embodiment for the picture detail 1000, the discrete cosine transformation is separately implemented for both fields with the instruction 2008.

In both instances, the computing program is subsequently continued at the program point 2010.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for calculating a decision result for a field/frame data compression method, wherein chronologically successive picture values of picture elements from a picture detail of a picture that may be moving on a case-by-case basis in a line jump scanning are recorded in picture lines of two fields that can be combined to form a frame, and whereby the field/frame data compression method is applied to the frame given a positive result of the decision but is otherwise separately applied to the two fields, comprising the steps of:

a) from a respective pair of field picture elements formed of two of the picture elements at an identical picture element position in respectively two of the immediately successive picture lines of the same field, calculating a respective field difference from a difference of the picture values of the picture elements of the pair of field picture elements and summing the absolute values of the field differences of all of the pairs of field picture elements of both fields to form a field sum;

b) of a respective pair of frame picture elements formed by two of the picture elements at the same picture element position in respectively two of the picture lines lying immediately next to one another in the frame composed of the fields in respectively one of the fields, calculating a respective frame difference of the difference of the picture values of the picture elements of the pair of frame picture elements and summing the absolute difference of the frame differences of all pairs of frame picture elements to form a frame sum;

c) multiplying the frame sum by a frame weighting factor to form a frame product and subtracting the frame product from the field sum to form the positive decision result.

2. The method according to claim 1, wherein the data compression method is a discrete cosine transformation.

3. The method according to claim 1, wherein the frame weighting factor has a numerical value between 0.8 and 1.0.

4. The method according to claim 3, wherein the frame weighting factor has the numerical value of 0.9.

5. The method according to claim 1, wherein the picture detail is a 16×16 picture element block of a video picture that is transformed as a 16×16 frame block.

6. The method according to claim 1, wherein the picture detail is recorded using a high-resolution television method.

7. The method according to claim 1, wherein the picture detail is an 8×8 picture element block of a video picture that is transformed as an 8×8 frame block.

8. The method according to claim 1, wherein the picture detail is a 16×16 picture element block of a video picture that is separately transformed in respectively two 16×8 field blocks.

9. The method according to claim 1, wherein the picture detail is recorded using high definition television.

10. The method according to claim 1, wherein the picture detail is an 8×8 picture element block of a video picture that is separately transformed in respectively two 8×4 field blocks.

* * * * *